United States Patent
Slavin et al.

(10) Patent No.: US 10,657,137 B2
(45) Date of Patent: May 19, 2020

(54) SYSTEMS AND METHODS FOR AGGREGATING, FILTERING, AND PRESENTING STREAMING DATA

(71) Applicant: JPMorgan Chase Bank, N.A., New York, NY (US)

(72) Inventors: Ilya Slavin, Brooklyn, NY (US); Mathew Alistair Legge, Horley (GB); Reed Alpert, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 306 days.

(21) Appl. No.: 15/378,501

(22) Filed: Dec. 14, 2016

(65) Prior Publication Data

US 2018/0165334 A1  Jun. 14, 2018

(51) Int. Cl.
| | | |
|---|---|---|
| *G06F 16/00* | (2019.01) | |
| *G06F 16/2455* | (2019.01) | |
| *H04L 29/06* | (2006.01) | |
| *G06F 21/62* | (2013.01) | |
| *H04L 29/08* | (2006.01) | |
| *G06Q 40/04* | (2012.01) | |
| *G06Q 40/06* | (2012.01) | |
| *G06Q 30/02* | (2012.01) | |

(52) U.S. Cl.
CPC .. *G06F 16/24568* (2019.01); *G06F 16/24552* (2019.01); *G06F 21/6218* (2013.01); *H04L 63/08* (2013.01); *H04L 67/2842* (2013.01); *G06Q 30/0201* (2013.01); *G06Q 40/04* (2013.01); *G06Q 40/06* (2013.01)

(58) Field of Classification Search
CPC ......... G06F 16/24568; G06F 16/24552; G06F 12/0802; G06F 21/6218; G06F 2212/154; G06F 2212/60; H04L 63/08; H04L 67/2842; G06Q 30/0201; G06Q 40/04; G06Q 40/06
See application file for complete search history.

(56) References Cited

U.S. PATENT DOCUMENTS

| | | | |
|---|---|---|---|
| 6,697,806 B1 * | 2/2004 | Cook | ............... G06F 21/31 |
| 2008/0086564 A1 * | 4/2008 | Putman | ............... H04L 29/06 |
| | | | 709/227 |

(Continued)

OTHER PUBLICATIONS

International Search Report and Written Opinion, International Application No. PCT/US17/66068, dated Mar. 7, 2018, pp. 1-7.

*Primary Examiner* — Jared M Bibbee
(74) *Attorney, Agent, or Firm* — Hunton Andrews Kurth LLP

(57) ABSTRACT

Systems and methods for aggregating, filtering, and presenting streaming data are disclosed. In one embodiment, a method for presenting streaming data may include (1) receiving, at web services layer for a server comprising at least one computer processor, a query from a client, wherein the query comprises a plurality of parameters; (2) a data caching layer for the server receiving streaming data from at least one predefined streaming data source; (3) the data caching layer conflating the streaming data for each of the plurality of parameters; (4) the data caching layer aggregating the conflated data; (5) the data caching layer generating a snapshot of the conflated data by simultaneously running the query against the conflated data; and (6) outputting the snapshot to the client.

20 Claims, 2 Drawing Sheets

(56) References Cited

U.S. PATENT DOCUMENTS

| | | | |
|---|---|---|---|
| 2009/0119416 A1* | 5/2009 | Sirdevan | G06Q 10/06 709/246 |
| 2009/0292677 A1* | 11/2009 | Kim | G06F 16/958 |
| 2011/0016160 A1* | 1/2011 | Zhang | G06F 16/24 707/805 |
| 2011/0302164 A1* | 12/2011 | Krishnamurthy | G06F 16/24568 707/737 |
| 2014/0157370 A1* | 6/2014 | Plattner | G06F 21/6245 726/4 |
| 2014/0351233 A1* | 11/2014 | Crupi | G06F 16/24568 707/706 |
| 2015/0248462 A1* | 9/2015 | Theeten | G06F 16/24568 707/688 |
| 2017/0201556 A1* | 7/2017 | Fox | H04L 65/605 |

* cited by examiner

SYSTEMS AND METHODS FOR AGGREGATING, FILTERING, AND PRESENTING STREAMING DATA

BACKGROUND OF THE INVENTION

1. Field of the Invention

The present disclosure generally relates to systems and methods for aggregating, filtering, and presenting streaming data.

2. Description of the Related Art

Both public and private clouds have become increasingly popular computing environments. These environments, however, do not support streaming data due to variable latency between the host system and the remote operating system. In addition, the cost of pushing terabytes of streaming market data into various clouds incurs very high "transit" fees from providers, decreasing the value proposition of using clouds for data-driven applications.

SUMMARY OF THE INVENTION

Systems and methods for aggregating, filtering, and presenting streaming data are disclosed. In one embodiment, a method for presenting streaming data may include (1) receiving, at web services layer for a server comprising at least one computer processor, a query from a client, wherein the query comprises a plurality of parameters; (2) a data caching layer for the server receiving streaming data from at least one predefined streaming data source; (3) the data caching layer conflating the streaming data for each of the plurality of parameters; (4) the data caching layer aggregating the conflated data; (5) the data caching layer generating a snapshot of the conflated data by simultaneously running the query against the conflated data; and (6) outputting the snapshot to the client.

In one embodiment, the parameters may include a specific descriptor for at least one of a security and an investment.

In one embodiment, the query may further include an identification of a streaming data source.

In one embodiment, the streaming data may include market data.

In one embodiment, the web services layer may output the snapshot that is delayed by a predetermined amount of time, wherein the period of time is based on one or more rule associated with the streaming data.

In one embodiment, the method may further include an entitlement services layer for the server verifying that the client is authorized to access information responsive to the query.

In one embodiment, the method may further include authenticating the client based on at least one client credential that is received from the client.

In one embodiment, the snapshot may be accurate for the at least one of the security and the investment for a certain time.

In one embodiment, the snapshot may include a proper state for the at least one of the security and the investment for a certain time.

According to another embodiment, a system for presenting streaming data may include a plurality of streaming data sources; a data loader for each streaming data source, the data loader receiving streaming data from the streaming data source; a data caching layer the receives the streaming data from the data loaders; and a web services layer comprising at least one computer processor in communication with the data caching layer. The web services layer may receive a query from a client, wherein the query comprises a plurality of parameters; the data caching layer may conflate the streaming data for each of the plurality of parameters; the data caching layer may aggregate the conflated data; the data caching layer may generate a snapshot of the conflated data by simultaneously running the query against the conflated data; and the snapshot may be output to the client.

In one embodiment, the parameters may include a specific descriptor for at least one of a security and an investment.

In one embodiment, the query may include an identification of a streaming data source.

In one embodiment, the streaming data may include market data.

In one embodiment, the web services layer may output the snapshot that is delayed by a predetermined amount of time.

In one embodiment, the period of time may be based on one or more rule associated with the streaming data.

In one embodiment, the query may be received from at least one of a cloud application and a local application.

In one embodiment, the system may further include an entitlement services layer for the server verifying that the client is authorized to access information responsive to the query. The entitlement services layer may further authenticate the client based on at least one client credential that is received from the client.

In one embodiment, the snapshot may be accurate for the at least one of the security and the investment for a certain time.

In one embodiment, the snapshot may represent a proper state for the at least one of the security and the investment for a certain time.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
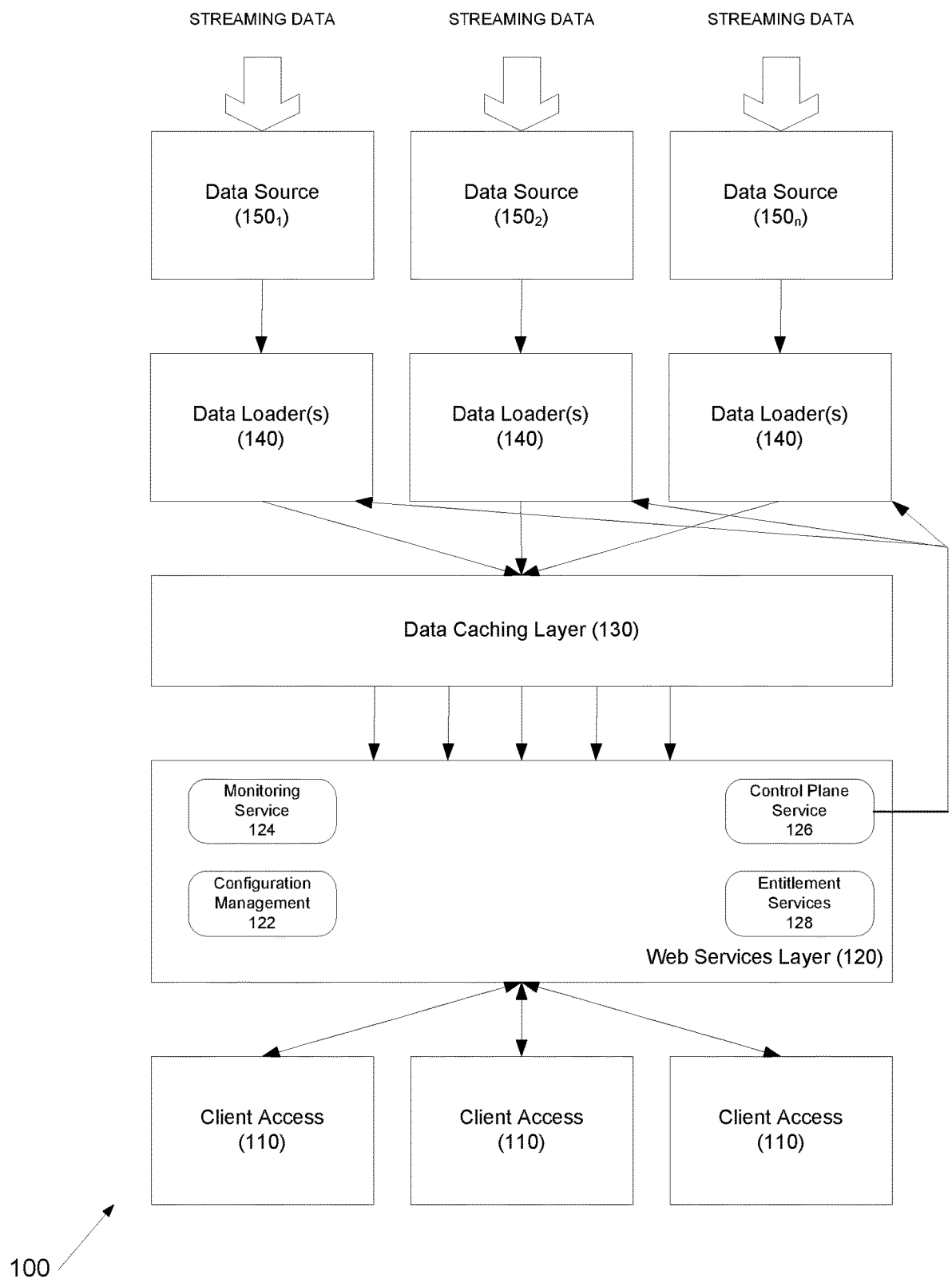
FIG. 1 depicts a system for aggregating, filtering, and presenting streaming data according to one embodiment.
Figure 2:
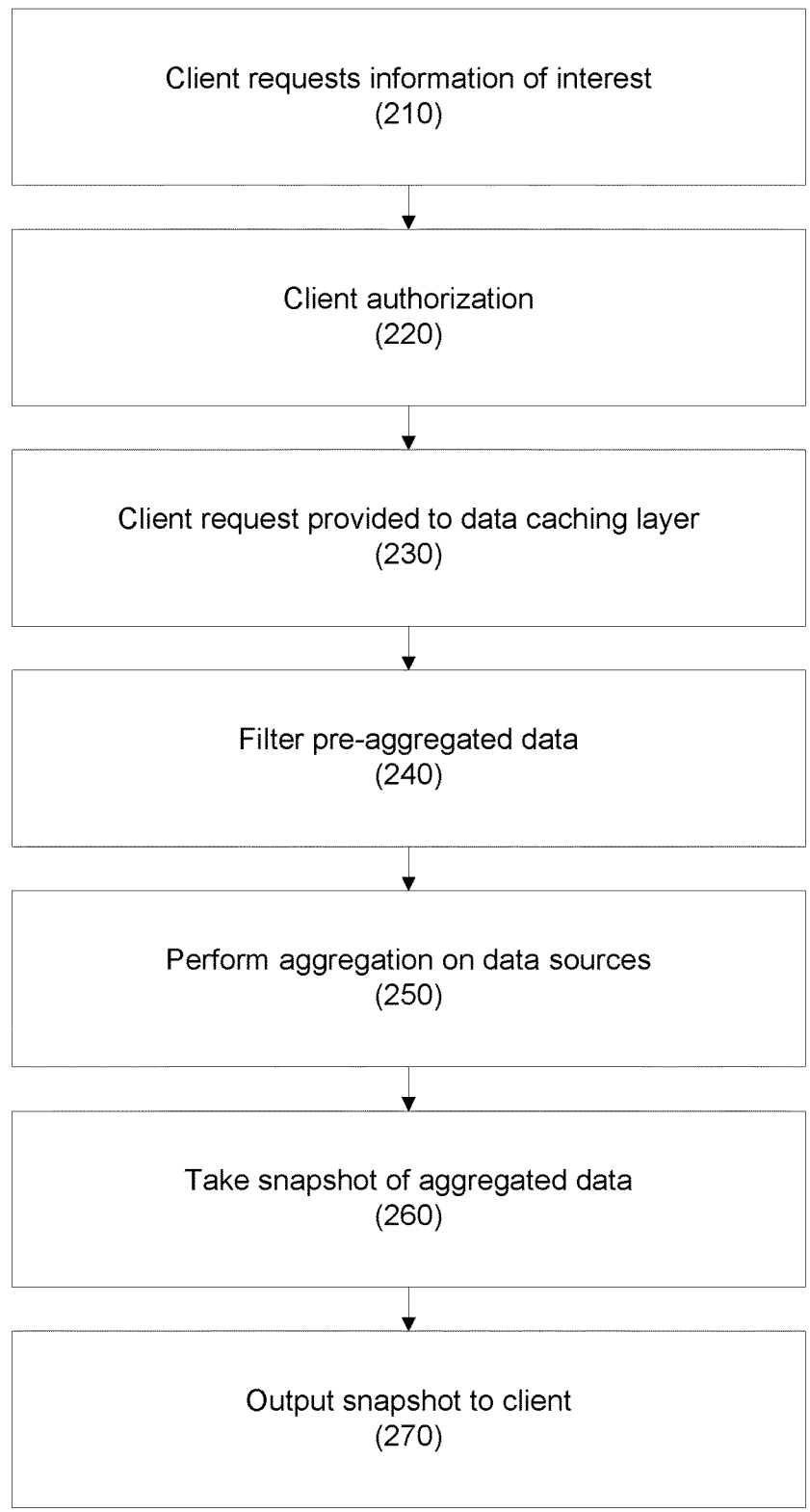
FIG. 2 depicts a method for aggregating, filtering, and presenting streaming data according to one embodiment.

Several embodiments of the present invention and their advantages may be understood by referring to FIGS. 1-2.

Embodiments are directed to systems and methods for aggregating, filtering, and presenting streaming data.

In one embodiment, data from internal and external sources may be pushed into a high-speed data aggregation engine. Clients may make a simple web services request, specifying their credentials, source of information, and list of requested information. For example, in a financial institution, clients may submit a list of list of securities and fields. The client then receives a single response with the information that the client needs. This reduces or eliminates high-speed stream management that all applications have to support as well as the required infrastructure and development.

In one embodiment, any suitable aggregation engine may be used as is necessary and/or desired. In one embodiment, the aggregation engine may permit Structured Query Language ("SQL")-style content filtering on individual fields within data payloads, allowing for near real-time analytics on a wide array of products.

Embodiments may provide some or all of the following: (1) increased price advantage of Cloud-based applications through lower data transit costs; (2) large scale reduction of technology costs through decreased infrastructure requirements and shorter development cycles for data-driven applications; (3) more fungible developer workforce due to simplification of API and integration with spreadsheets; (4) advanced content filtering across disparate sources permits development of real-time application features that were cost prohibitive in the past; (5) facilitated distributed analytics through merging of external and internal data; and (6) the ability to age, or delay, the delivery of real-time data for individuals that do not need the data in real-time data to reduce the cost of that data. Other benefits may also be provided.

In the financial industry, because market data and messaging involves a large amount of data, clients are expected to do significant work associated with dealing with payload coining out of the ticker plants. They often have to deal with hardware and software challenges related to large volumes of information, conflate it in order for users to derive benefits, aggregate across many threads and systems to support portfolio management, etc. Embodiments address these and other challenges while giving end users and developers an interface with filtering.

Referring to FIG. 1, a system for aggregating, filtering, and presenting streaming data is disclosed according to one embodiment. System 100 may include a plurality of client access points 110, web services layer 120, data caching layer 130, data loaders $140_1$, $140_2$, ... $140_n$, and data sources $150_1$, $150_2$, ... $150_n$. Data sources 150 may receive data from one or more streaming data source, such as internal and external market data, industry news, etc.

Although three data loaders 140 and data sources 150 are illustrated in FIG. 1, it should be recognized that a greater or fewer number of data loaders 140 and data sources 150 may be provided as is necessary and/or desired.

Data loaders 140 may receive data from data sources 150. In one embodiment, each data loader 140 may "feed" streaming data from one or more data source 150 into data caching layer 130. Each data loader 140 may further be in communication with web services layer 120. For example, each data loader 140 may communicate with control plane service 126, which may instruct one or more data loader 140 to create a new subscription, retry a failure, etc.

Data caching layer 130 may service requests from, web services layer 120. In one embodiment, data caching layer 130 may function as both a database and a message bus.

In one embodiment, data caching layer 130 may also filter the data and may provide a "snapshot" of requested data.

An example of a suitable data caching layer 130 is the Advanced Message Processing System (AMPS) from 60 East Technologies.

Web services layer 120 may interface with clients using one or more client access points 110. In one embodiment, web services layer may provide services, such as configuration management service 122, monitoring service 124, control plane layer 126, and entitlement services 128. Other services may be provided as is necessary and/or desired.

In one embodiment, configuration management service 122 may provide configuration data for one or more data loader 140, such as what data sources 150 to connect to, how to connect to data sources 150, etc. In one embodiment, configuration management service 122 may provide run-time configuration information for, for example, connection information (e.g., host:port) for data loaders 140, web services layer 120, entitlement services 128, what data feeds to load, what web connections to support (http or https), SSL certificate locations, connection and thread pool sizing, logging intervals, environment (dev/test/prod), etc.

In one embodiment, monitoring service 124 may monitor a status of one or more data source 150, and may re-route requests if a data source becomes unavailable.

Control plane service 150 may interface with one or more data loaders 140. In one embodiment, control plane service 150 may pass directives between services, allowing both automated instructions (e.g., monitoring service 124 notices a failure of a data loader and instructs web service layer 120 to switch servers within data aggregation layer 130), or manual directives (e.g., an operations team wants to take a service offline).

In one embodiment, entitlement services 128 may verify that the client is allowed to access the data that is requested.

In one embodiment, client access points 110 may include, for example, cloud applications, local application, user interfaces, APIs, etc. In one embodiment, client access point 110 may provide, for example, a spreadsheet as its output to a client.

In one embodiment, system 100 may include the ability to provide a "subscription" for a client to receive updates. In one embodiment, updates to a complex query may be smaller in size than re-submitting the query, and receiving a full result set several times a second.

Referring to FIG. 2, a method for aggregating, filtering, and presenting streaming data is disclosed according to one embodiment.

In step 210, a client may request information of interest via an interface, such as a cloud application, a local application, an upload, etc. In one embodiment, the client may also provide credentials and identify the source of information and a list of requested information. In another embodiment, machine learning may be used to identify the sources based on past queries.

In one embodiment, the client may use a web service protocol to request the information. The web service protocol may use, for example, SQL-like syntax for filtering information. An example query that may be submitted is "(/BID//ASK>=(0.05*/TRDPRC_1))", which means "where value of BID divided by value of ASK is greater or equal to 5% of the value of "TRDPRC_1."

In a financial system, the query may include an identification of a stock, industry, an field/area of interest, etc. The query may be used in filters.

In one embodiment, the request may be a subscription (e.g., to a stock, industry, etc.). In one embodiment, the request may specify a period or condition for each snapshot to be provided.

In step 220, the client may be authorized to access the requested data. In one embodiment, this may involve an entitlement check to determine if the client is permitted access to the requested information.

In one embodiment, the client may be further authenticated based on credentials that may be provided as part of the request.

In step 230, the request may be provided to the data caching layer, which, in step 240, may filter the data received from streaming data sources. The data caching layer may also "snapshot" the data, that is, provide a data state at a particular instance in time.

In one embodiment, business logic may reduce the number of fields of data that are presented to the client.

In step 250, the filtered data may be conflated. For example, data from more than one source that has been filtered may be aggregated. For example, in a minute, a stock may change in price from 70.00 to 70.05, back to 69.90 and up to 70.01. With a conflated source, client would only receive 70.01 since that was the proper state of the price at the end of the minute. This value, however, not be the last value as it is not always the proper data point, in particular for a dataset with multiple fields, such as Bid and Ask.

In step 260, a data snapshot of the data may be generated. In one embodiment, a snapshot may be for a collection of securities, and may be accurate across that collection at that point of time. For example, the query may be run simultaneously across the data that has been aggregated (e.g., the securities of interest) rather than sequentially.

In step 270, the snapshot may be output to the client via a web application, local application, API, spreadsheet, etc.

In one embodiment, the delivery of the snapshot may be delayed by a predetermined amount of time in order to "age" the data. For example, the timing for data delivery may determine whether the data can be delivered for free, or if there is a fee for the data. Not all clients require real-time data; for example, an investment manager may not need real-time data when meeting prospective clients.

Thus, in one embodiment, the system may determine how long to delay the output of the snapshot, which may be based on rules associated with the data and/or the data source, and may delay the snapshot by at least this amount of time. In one embodiment, an auditable trail of the age of the data in the snapshot may be maintained.

Although several embodiments have been disclosed, it should be recognized that these embodiments are not exclusive to each other.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for presenting streaming data, comprising:
  receiving, at web services layer for a server comprising at least one computer processor, a query from a client, wherein the query comprises a plurality of parameters, and wherein the web services layer further comprises:
   a control plane service;
   an entitlement service;

a monitoring service; and
a configuration management service;
a data caching layer for the server receiving streaming data from at least one predefined streaming data source via corresponding data loaders, wherein:
the control plane service is configured to provide instructions to the data loaders, wherein the instructions comprise one or more of create a new subscription and move a data source that has failed to stream data;
the configuration management service provides configuration data for the data loaders, wherein the configuration data comprises one or more of information regarding a data source to connect to and how to connect to that specified data source;
the monitoring service monitoring the status of the at least one predefined streaming data source and re-routing the client query if the data source becomes unavailable; and
the entitlement service verifying that client is allowed to access the streaming data corresponding to the query;
the data caching layer conflating the streaming data for each of the plurality of parameters;
the data caching layer aggregating the conflated data;
the data caching layer generating a snapshot of the conflated data by simultaneously running the query against the conflated data; and
outputting the snapshot to the client.

2. The method of claim 1, wherein the parameters comprise a specific descriptor for at least one of a security and an investment.

3. The method of claim 1, wherein the query further comprises an identification of a streaming data source.

4. The method of claim 1, wherein the streaming data comprises market data.

5. The method of claim 1, wherein the web services layer outputs the snapshot that is delayed by a predetermined amount of time, wherein the period of time is based on one or more rule associated with the streaming data.

6. The method of claim 1, further comprising:
an entitlement services layer for the server verifying that the client is authorized to access information responsive to the query.

7. The method of claim 1, further comprising:
authenticating the client based on at least one client credential that is received from the client.

8. The method of claim 2, wherein the snapshot is accurate for the at least one of the security and the investment for a certain time.

9. The method of claim 2, wherein the snapshot comprises a proper state for the at least one of the security and the investment for a certain time.

10. A system for presenting streaming data, comprising:
a plurality of streaming data sources;
a data loader for each streaming data source, the data loader receiving streaming data from the streaming data source;
a data caching layer the receives the streaming data from the data loaders; and
a web services layer comprising at least one computer processor in communication with the data caching layer and further comprising:
a control plane service in communication with the data loaders;
an entitlement service;
a monitoring service; and
a configuration management service;
wherein:
the web services layer receiving a query from a client, wherein the query comprises a plurality of parameters;
the data caching layer conflates the streaming data for each of the plurality of parameters;
the data caching layer aggregating the conflated data;
the data caching layer generating a snapshot of the conflated data by simultaneously running the query against the conflated data;
the snapshot is output to the client;
the control plane service provides instructions to the data loaders, wherein the instructions comprise one or more of create a new subscription and move a data source that has failed to stream data;
the configuration management service provides configuration data for the data loaders, wherein the configuration data comprises one or more of information regarding a data source to connect to and how to connect to that specified data source;
the monitoring service monitors the status of the at least one predefined streaming data source and re-routing the client query if the data source becomes unavailable; and
the entitlement service verifies that client is allowed to access the streaming data corresponding to the query.

11. The system of claim 10, wherein the parameters comprise a specific descriptor for at least one of a security and an investment.

12. The system of claim 10, wherein the query further comprises an identification of a streaming data source.

13. The system claim 10, wherein the streaming data comprises market data.

14. The system of claim 10, wherein the web services layer outputs the snapshot that is delayed by a predetermined amount of time.

15. The system of claim 14, wherein the period of time is based on one or more rule associated with the streaming data.

16. The system of claim 10, wherein the query is received from at least one of a cloud application and a local application.

17. The system of claim 10, further comprising:
an entitlement services layer for the server verifying that the client is authorized to access information responsive to the query.

18. The system of claim 17, wherein the entitlement services layer further authenticates the client based on at least one client credential that is received from the client.

19. The system of claim 11, wherein the snapshot is accurate for the at least one of the security and the investment for a certain time.

20. The system of claim 11, wherein the snapshot comprises a proper state for the at least one of the security and the investment for a certain time.

* * * * *